No. 622,791. Patented Apr. 11, 1899.
W. ALEXANDER.
MACHINE FOR MAKING MILLING CUTTERS.
(Application filed Dec. 28, 1897.)
(No Model.) 3 Sheets—Sheet 2.
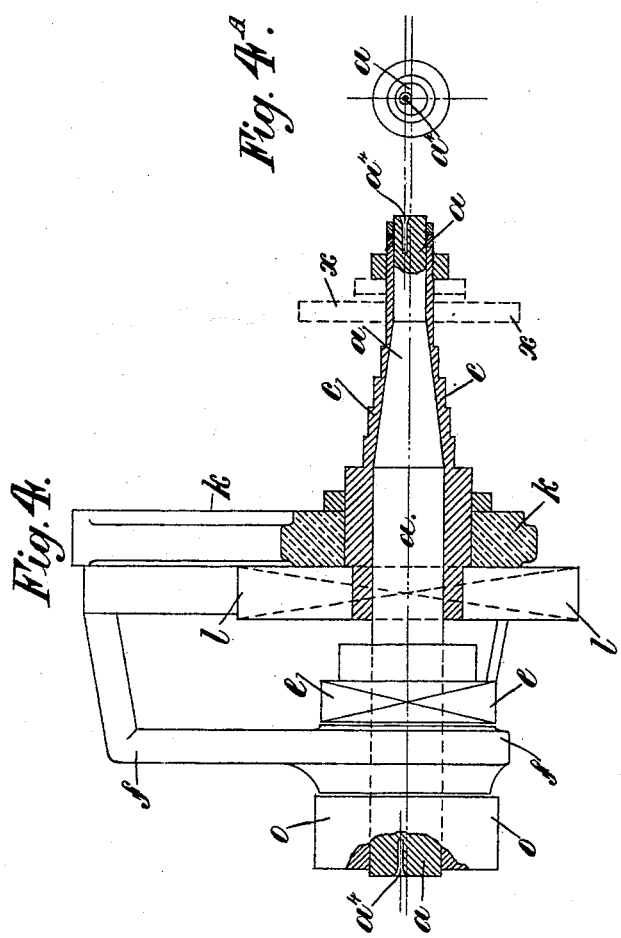
Witnesses.
E. B. Bolton
O. Dunn
Inventor.
William Alexander
By Richards
his Attorneys.

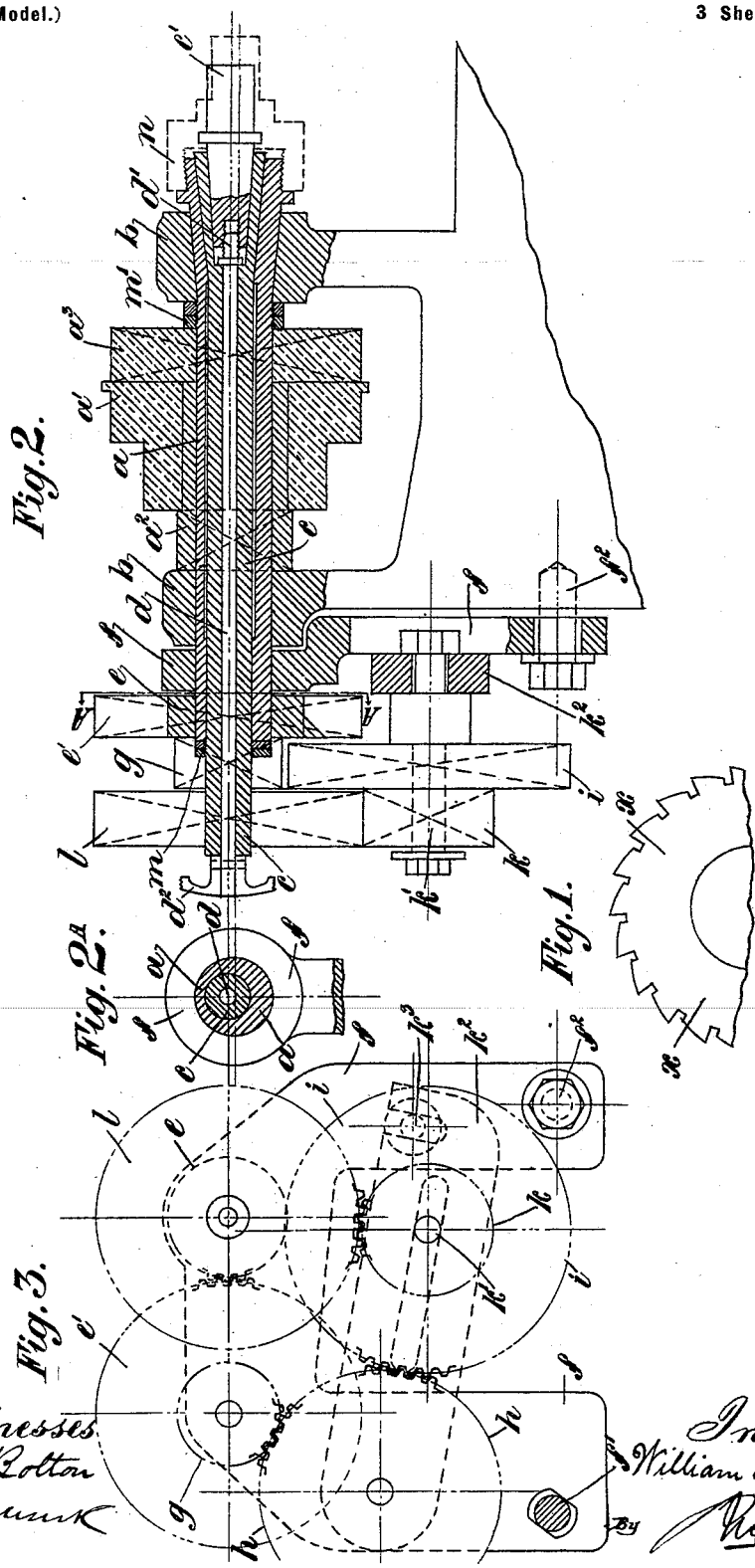

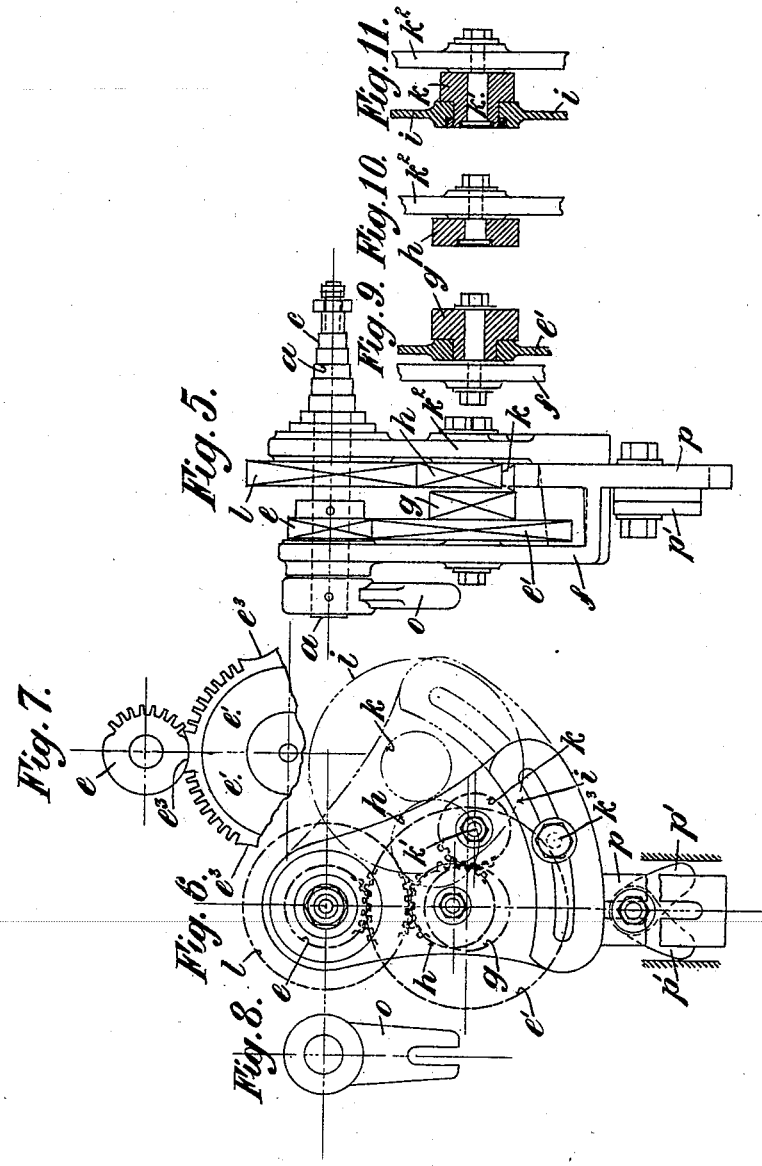

UNITED STATES PATENT OFFICE.

WILLIAM ALEXANDER, OF BIRKENHEAD, ENGLAND.

MACHINE FOR MAKING MILLING-CUTTERS.

SPECIFICATION forming part of Letters Patent No. 622,791, dated April 11, 1899.

Application filed December 28, 1897. Serial No. 663,929. (No model.)

*To all whom it may concern:*

Be it known that I, WILLIAM ALEXANDER, civil engineer, a subject of the Queen of Great Britain and Ireland, residing at 11 Moss Grove, Birkenhead, in the county of Chester, England, have invented certain new and useful Improvements in Machinery for Making Milling-Cutters, of which the following is a specification.

This invention relates to appliances for backing off or giving a back clearance to the cutting-teeth of rotary cutters of the class used in milling machinery. In order to effect such backing off or curving of the teeth of rotary cutters by machinery, two conditions are necessary—namely, the cutter-tooth and the forming-tool must approach and recede from one another, and, secondly, the rotation of the cutter must be intermittent, so that each tooth is successively dealt with by the tool. In the machines which I am now about to describe such approaching and receding of the cutter and the tool is due to the eccentricity of the axis of the cutter toward the axis upon which it is revolved, and I desire to point out that backing-off appliances in which the cutter is eccentrically mounted have heretofore been proposed, and I make no claim to the principle of eccentric mounting *per se.*

I will now proceed to describe my invention with the aid of the accompanying drawings, in which—

Figure 1 is a portion of a rotary cutter whose teeth are backed off or provided with a back clearance. Fig. 2 is a sectional elevation of a machine whereby such backing off is obtained. Fig. $2^a$ is a detail of Fig. 2, and Fig. 3 is a diagrammatic end view thereof. Fig. 4 illustrates a modified appliance for backing off rotary cutters. Fig. $4^a$ is a detail view relating to Fig. 4. Fig. 5 is a side view, and Fig. 6 an end view, of Fig. 4. Figs. 7 to 11 are detail views.

With reference to Figs. 2 and 3, $a$ is a hollow spindle, to which rotary movement is communicated by the speed-cones $a'$. The cones $a'$ are mounted on the sleeve of a pinion-wheel $a^2$, which by means of back-gearing consisting of speed-reducing wheels mounted on a secondary shaft (not illustrated) drives the spur-wheel $a^3$, which is keyed upon the spindle $a$. The spindle $a$ rotates in the bearings $b$ and is bored out longitudinally but eccentrically to its axis. The amount of such eccentricity will be governed by the amount of backing off or clearance to be given to the cutter-teeth and usually will be equal to about half the total clearance required. A second hollow spindle $c$ is fitted into the bore of the spindle $a$ and is free to rotate therein. The spindle $c$ is arranged to carry the cutter to be backed off—namely, upon the mandrel $c'$, which latter is secured in a coned socket in the spindle $c$ by the rod $d$, having a screwed end $d'$ and a milled head $d^2$.

The tool by which the teeth of the cutter are backed off is held in a stationary but adjustable slide or holder of any convenient form.

While the rotation of the spindle $a$ is constant, that of the spindle $c$ must be intermittent, so that during a portion (preferably about half) of a revolution of the spindle $a$ the spindle $c$ remains stationary and during the remaining half-revolution of the spindle $a$ the spindle $c$ has rotary motion. As the spindle $a$ is rotated the spindle $c$ and the cutter alternately approach and recede from the tool, the spindle $c$ being eccentric, and the object of the above-mentioned intermittent rotation of the spindle $c$ is that the spindle and cutter shall rotate to an extent equal to the length of one tooth of the cutter while the tooth is in contact with and approaching the forming-tool and shall have no rotation when receding therefrom. In order to obtain such intermittent rotation of the spindle $c$, I gear it with the spindle $a$ by gearing having a ratio corresponding to the number of cutting-teeth in the cutter to be operated upon, which gear will now be described.

On the spindle $a$ is keyed a tooth-wheel $e$, which meshes with a tooth-wheel $e'$, journaled in a frame $f$. The teeth of these wheels $e$ and $e'$ are so arranged that while the wheel $e$ revolves constantly the wheel $e'$ has motion intermittently imparted to it, and I prefer to use wheels constructed as shown in Fig. 7. It will be seen that the wheel $e$ has a number of teeth and a plain convex $e^2$, while the wheel $e'$ has groups of teeth corresponding in number to those of the wheel $e$, said groups being divided by concaves $e^3$. Thus while the convex $e^2$ revolves in a concave $e^3$ the wheel $e'$ is locked and stationary. The wheel $e'$ has a pinion $g$, which meshes with an idle-wheel $h$, which in turn meshes with a wheel $i$. The wheel $i$ is a change-wheel—that is, wheels of a larger or smaller diameter may be substituted therefor—and for this purpose the wheel $i$ is temporarily mounted upon a pinion $k$, which revolves upon a stud $k'$, which is bolted to a link $k^2$, pivoted to the frame $f$. The pinion $k$ meshes with the spur-wheel $l$, which is keyed upon and revolves the spindle $c$, carrying the mandrel $c'$ and cutter $x$.

Inasmuch as the spindle $c$ rotates in an eccentric path it follows that the train of wheels connecting the wheel $e$ on the spindle $a$ must follow such motion, and for this purpose the portion of the spindle $a$ which projects from the rear bearing $b$ is eccentric to the portion of the spindle $a$ which revolves in the bearings $b\ b$ and concentric with the spindle $c$ within it, (see Fig. 2,) and on such eccentric portion of the spindle $a$ the wheel $e$ is keyed and the frame $f$ is hung. The frame $f$ is guided in its eccentric movement by the studs $f'\ f^2$, which allow it sufficient play, but prevent it from rotating. The link $k^2$ is adjustably secured to the frame $f$ by the stud $k^3$.

$m$ are ring-nuts on the spindle $a$, whereby the latter is adjusted longitudinally, and $m'$ are similar nuts provided on the spindle $c$ for the same purpose. That end of the spindle $a$ which has a true circular rotation is screw-threaded to receive a mandrel $n$, upon which the cutter-blanks may be turned up prior to tooth-cutting and backing off.

The machine above described may also be used for cutting the teeth in rotary cutters prior to backing them off—namely, by mounting the blank on the intermittently rotating, approaching, and receding mandrel $c'$, the usual form of cutting appliance being employed.

It will be seen that while the machine illustrated in Figs. 2 and 3 forms a complete and self-contained machine for turning a cutter-blank, cutting its teeth, and backing off the teeth of rotary cutters the device which I will now describe with reference to Figs. 4 to 11 is adapted to be applied to any suitable lathe.

Upon reference to Figs. 4 to 11 it will be seen that the intermittently-rotating spindle $c$ rotates on the exterior of the spindle $a$, while an eccentric motion is given to the latter by disposing the center holes $a^4$, which receive the lathe-centers, eccentrically to the axis of the spindle $a$. Constant rotary motion is imparted to the spindle $a$ through the arm $o$, Fig. 8, from a pin fixed in the lathe face-plate. In order to transform such constant rotary motion into intermittent rotary motion, I employ a gear which is similar in essentials to that already described. The wheel $e$, which is keyed on the spindle $a$, meshes with the wheel $e'$, which is journaled in the swinging frame $f$. The construction of these wheels has already been described with reference to Fig. 7, their function being to transform the constant rotary motion of the spindle $a$, on which the wheel $e$ is mounted, into intermittent motion. The wheel $e'$ is mounted on a pinion $g$, Fig. 9, which meshes with a change-wheel $i$, mounted on a pinion $k$, Fig. 11. The pinion $k$ meshes with an idle-wheel $h$, Fig. 10, which in turn meshes with the spur-wheel $l$, which is keyed upon and turns the spindle $c$.

In order that the train of wheels above referred to may follow the concentric path of the spindles, they are carried by a frame $f$, which hangs upon the spindles and is prevented from rotating by means of the leg $p$ and expanding leaves $p'$, which lie in the lathe-bed gap. In order that the wheel $i$ may be changed for one of larger or smaller diameter, its journal $k'$ is bolted to the sector or adjustable side $k^2$ of the frame $f$, which hangs upon the spindle $c$, and is clamped by the stud $k^3$. The idle-wheel $h$ is also journaled on the sector $k^2$. In Fig. 6 the largest change-wheel $i$ is represented by a dotted line, the sector and change-wheel $h$ being dotted in their corresponding positions.

The spindle $c$, Fig. 4, is stepped in order to accommodate cutters of various sizes.

The circles in the drawings representing the various gear-wheels may be taken as the pitch-lines thereof.

What is claimed in respect of the herein-described invention is—

1. In machinery for making milling-cutters, the combination of a continuously-revolving spindle; an intermittently-revolving spindle one within the other, said intermittently-revolving spindle being adapted to carry the blank to be cut, and the other adapted to impart a to-and-fro movement to the intermittently-revolving spindle each revolution; and gearing, comprising a pinion with teeth about a portion of its periphery, and a blank cylindrical portion for the other part of its periphery, and constituting a driving gear-wheel; and a gear-wheel meshing with and driven by said driving-wheel, having a portion of its periphery consisting of teeth, and a portion consisting of a concavity adapted to mesh with the convex cylinder portion of the driving gear-wheel, and geared with and adapted to drive and rotate the said intermittently-revolving spindle carrying the blank to be cut.

2. In a machine for making milling-cutters, the combination of a continuously-revolving spindle; an intermittently-revolving spindle one within the other, said intermittently-revolving spindle being adapted to carry the blank to be cut, and the other adapted to impart a to-and-fro movement to the intermittently-revolving spindle each revolution; tooth-gearing between said constantly-revolving and intermittently-revolving spindles, by which the intermittently-revolving one is intermittently operated from the continuously-revolving one; and a frame carrying said gearing and supported from one of the spindles and free to follow the vibratory movement thereof; substantially as set forth.

3. In a machine for making milling-cutters, an intermittently-revolving spindle carrying the blank to be cut; in combination with a gearing connected with it for intermittently revolving it, comprising a constantly-revolving wheel having a portion of its periphery consisting of teeth, and a portion consisting of a blank cylindrical portion; and a wheel driven thereby, and having its periphery consisting of alternate portions of teeth and concavities, by which the blank is intermittently rotated past the tool by which it is cut.

4. In a machine for making milling-cutters, the combination of the constantly-revolving spindle $a$; the intermittently-revolving spindle $c$ carrying the blank to be cut; the pinion $e$ having a portion of its periphery provided with teeth fixed on the spindle $a$; and a wheel $e'$ meshing with and driven from $e$, having a plurality of portions of its periphery consisting of teeth and concavities, alternately; and intermediate speed-change gearing interposed between $e'$ and the intermittently-revolving spindle $c$; substantially as set forth.

5. In a machine for making milling-cutters, the combination of the constantly-revolving spindle $a$; the intermittently-revolving spindle $c$ carrying the blank to be cut; the gearwheels $e\ e'$ and intermediate tooth-gearing for intermittently revolving said spindle $c$; and the frame $f$ carrying said gearing and hung upon said spindles and vibrated therewith; substantially as set forth.

6. In a machine for making milling-cutters, the combination of the constantly-revolving spindle $a$; the intermittently-revolving spindle $c$ carrying the blank to be cut; the gearwheels $e\ e'$ and intermediate tooth-gearing for intermittently revolving said spindle $c$; and the frame $f$ carrying said gearing and hung upon said spindles and vibrated therewith; and the adjustable arm $k^2$ carrying a change-wheel portion of said gearing; substantially as set forth.

7. In a machine for making milling-cutters, the combination of the constantly-revolving spindle $a$; and intermittently-revolving spindle $c$ carrying the blank to be cut; the gearwheels $e\ e'$ and intermediate tooth-gearing for intermittently revolving said spindle $c$; and the frame $f$ carrying said gearing and hung upon said spindles and vibrated therewith; and the expanding leg $p$ upon the frame adapted to fit and work in the longitudinal space between the two mechanisms of the machine-bed; substantially as set forth.

In testimony whereof I have hereunto set my hand in presence of two subscribing witnesses.

WILLIAM ALEXANDER.

Witnesses:
 E. R. ROYSTON,
 JOHN H. WALKER.